United States Patent
Hsieh et al.

(10) Patent No.: US 9,609,446 B2
(45) Date of Patent: Mar. 28, 2017

(54) SENSOR SYSTEMS

(71) Applicant: Quanta Computer Inc., Taoyuan (TW)

(72) Inventors: Yu-Lin Hsieh, Taoyuan (TW); Hsin-Liang Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 113 days.

(21) Appl. No.: 14/594,360

(22) Filed: Jan. 12, 2015

(65) Prior Publication Data

US 2016/0174005 A1    Jun. 16, 2016

(30) Foreign Application Priority Data

Dec. 12, 2014  (TW) .............................. 103143426 A

(51) Int. Cl.
H04R 29/00  (2006.01)
(52) U.S. Cl.
CPC ........... H04R 29/00 (2013.01); H04R 29/008 (2013.01)
(58) Field of Classification Search
CPC .............................. H04R 29/00; H04R 29/008
USPC ............................................................ 381/17
See application file for complete search history.

(56) References Cited

U.S. PATENT DOCUMENTS

2013/0092843 A1*  4/2013  Turqueti ................... G01T 7/00
                                                            250/369

* cited by examiner

*Primary Examiner* — David Ton
(74) *Attorney, Agent, or Firm* — McClure, Qualey & Rodack, LLP

(57) ABSTRACT

A sensor system is provided. The sensor system includes a control device and a sensor device. The control device has an audio combo jack and selectively provides an audio signal to the audio combo jack. The sensor device is connected with the audio combo jack. The sensor device includes a transformer, a rectifier, a power supply circuit, and a sensor. The transformer receives the audio signal through the audio combo jack and amplifies the audio signal to generate an amplified audio signal. The rectifier, coupled to the transformer, receives the amplified audio signal and rectifies the amplified audio signal to generate a rectified voltage signal. The power supply circuit is controlled by the rectified voltage signal to provide a supply voltage. The sensor is powered by the supply voltage to perform a sensing operation. An output signal which carries information related the sensing operation is generated.

7 Claims, 3 Drawing Sheets

SENSOR SYSTEMS

CROSS REFERENCE TO RELATED APPLICATIONS

This Application claims priority of Taiwan Patent Application No. 103143426, filed on Dec. 12, 2014, the entirety of which is incorporated by reference herein.

BACKGROUND OF THE INVENTION

Field of the Invention

The invention relates to a sensor system which includes a sensor device. The sensor device is capable of receiving an audio signal from an audio combo jack and enabling an internal power supplier for a power supplement in response to receipt of the audio signal.

Description of the Related Art

Recently, portable devices have found widespread application. Thus, the issue of communication between a power supplier of one portable device and other devices has become more important. Generally, most electronic products is equipped an audio combo jack for outputting and receiving audio signals. In current applications, one electronic device may transmit signals, through its audio combo jack, to an external electronic device (such as an image-capture device, a sensing device, and so on), and external electronic device then transforms the received signals into electronic energy to serve as a power source. However, the current power specification of signals received from audio combo jacks is not unified, so the external device cannot obtain sufficient power from various electronic devices.

Moreover, when several portable devices communicate with each other, at least one circuit or function can be shared, which may reduce the size of the devices and enhance convenience

BRIEF SUMMARY OF THE INVENTION

Thus, it is desirable to provide a sensor system with a sensor device which is capable of receiving signals from an audio combo jack and enabling an internal power supplier for power supplement in response to the receipt of the audio signal. Accordingly, the sensor device may have a sufficient power source and support communication with most electronic devices for communication.

An exemplary embodiment of a sensor system comprises a control device and a sensor device. The control device has an audio combo jack and selectively provides an audio signal to the audio combo jack. The sensor device is connected with the audio combo jack. The sensor device comprises a transformer, a rectifier, a power supply circuit, and a sensor. The transformer receives the audio signal through the audio combo jack when the control device provides the audio signal and amplifies the audio signal to generate an amplified audio signal. The rectifier which is coupled to the transformer receives the amplified audio signal and rectifies the amplified audio signal to generate a rectified voltage signal. The power supply circuit is coupled to the rectifier and is controlled by the rectified voltage signal to provide a supply voltage. The sensor is coupled to the power supply circuit and powered by the supply voltage to perform a sensing operation. An output signal which carries information related the sensing operation is generated.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
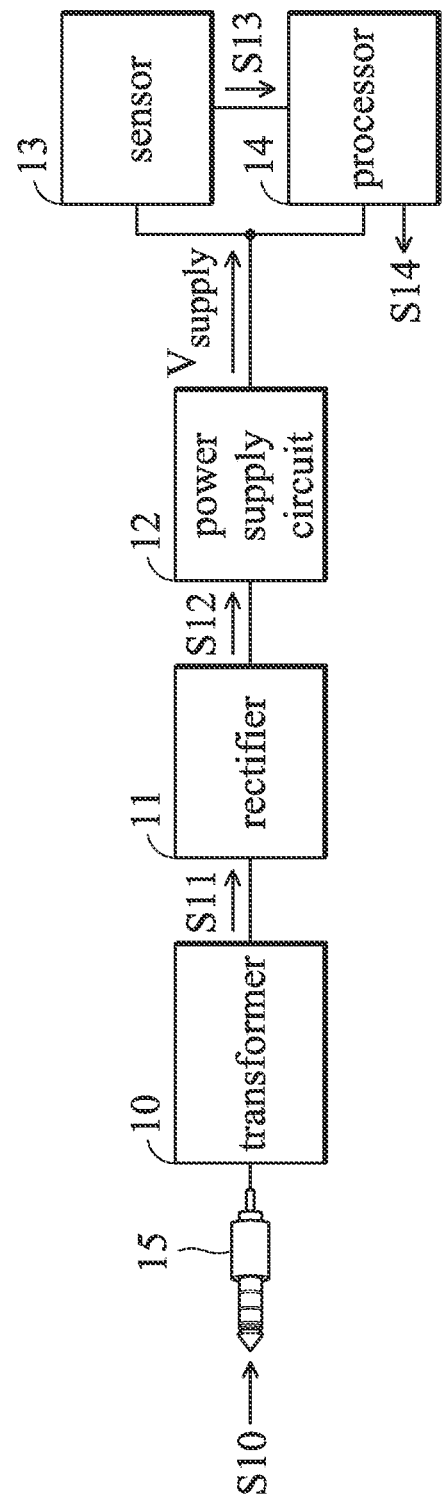
FIG. 1 shows an exemplary embodiment of a sensor device.

In an exemplary embodiment of a sensor device in FIG. 1, a sensor device 1 comprises a transformer 10, a rectifier 11, a power supply circuit 12, a sensor 13, and processor 14. The sensor device 1 further comprises a connector 15 used to connect to other devices for communication. In the embodiment, the connector 15 is an audio combo connector. When the audio combo connector 15 receives an audio signal S10, the audio signal S10 is transmitted to the transformer 10. At this time, the transformer 10 amplifies the audio signal S10 to generate an amplified audio signal S11. In the embodiment, the audio signal is an alternating current (AC) signal and has weaker signal power. The rectifier 11 is coupled to the transformer 10 and receives the amplified audio signal S11 from the transformer 10. The rectifier 11 rectifies the amplifier audio signal S11 to generate a rectified voltage signal S12. In the embodiment, the rectifier 11 performs a half-wave rectification on the amplified audio signal S11 to generate a DC (direct-current) rectified voltage signal S12. The power supply circuit 12 is coupled to the rectifier 11. The power supply circuit 12 receives the rectified voltage signal S12 from the rectifier 11 and is controlled by the rectified voltage signal S12. In detail, if the rectified voltage signal S12, which is generated when the audio combo connector 15 receives the audio signal S10, has a specific voltage level, the rectified voltage signal S12 with the specific voltage level controls the power supply circuit 12 to provide a supply voltage Vsupply to the sensor 13 and the processor 14. At this time, the sensor 13 is powered by the supply voltage Vsupply. So the sensor 13 can perform normal operations, such as sensing operations. When the sensor 13 is performing a sensing operation, the sensor 13 generates a corresponding sensing signal S13. The processor 14 coupled to the sensor 13 receives the sensing signal S13. Since the processor 14 is also powered by the supply voltage Vsupply, the processor 14 can operate normally to perform a predetermined processing to the sensing signal S13 to generate an output signal S14. The output signal S14 carries the information related to the sensing operation. For example, the information carried on the output signal S14 indicates the sensing result of the sensing operation performed by the sensor 14.

According to the above embodiment, the audio signal S10 received by the sensor device 1 through the audio combo connector 15 serves as an enable signal of the power supply circuit 12. In other words, when the sensor device 1 receives the audio signal S10 through the audio combo connector 15, the power supply circuit 12 is enabled to provide the supply voltage Vsupply to the sensor 13 and the processor 14; otherwise, the power supply circuit 12 is not enabled (it is disabled) to provide the supply voltage Vsupply to the sensor 13 and the processor 14.

Figure 2:
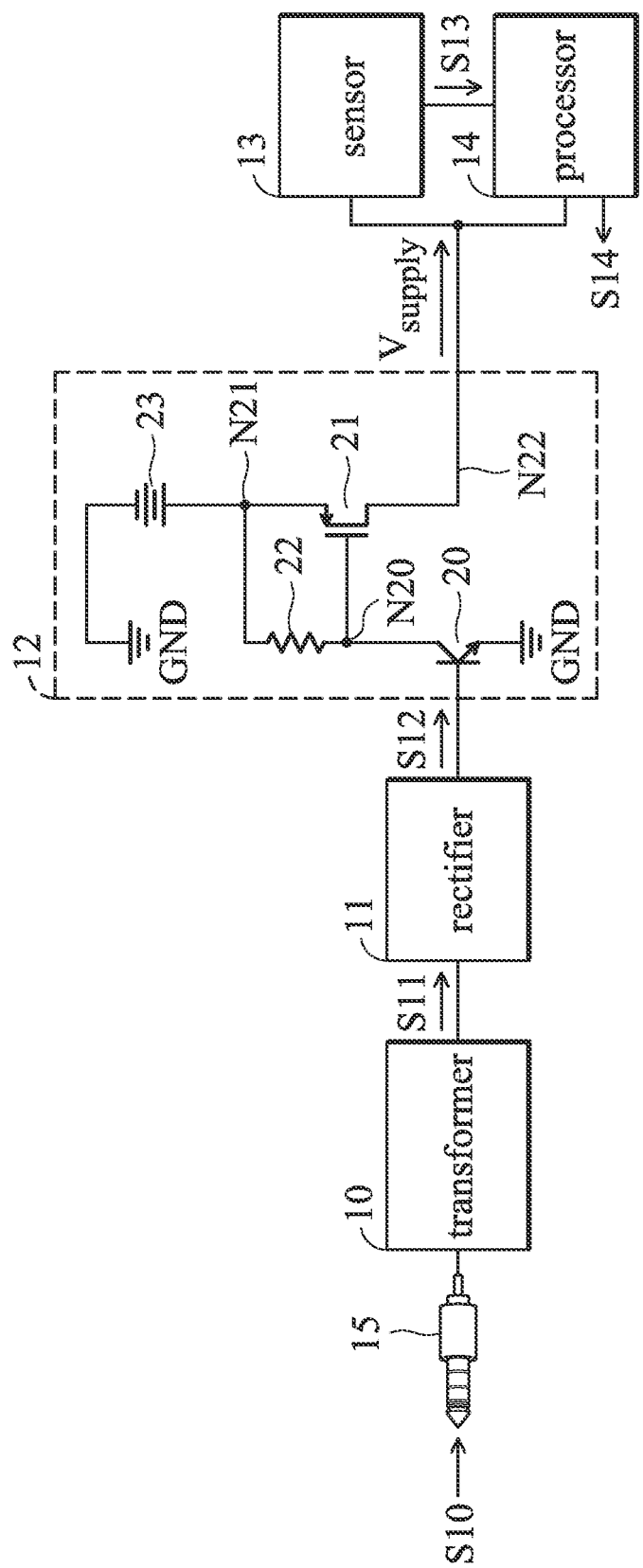
FIG. 2 shows an exemplary embodiment of a power supply circuit in FIG. 1.

FIG. 2 shows an exemplary embodiment of the power supply circuit 12. Referring to FIG. 2, the power supply circuit 12 comprises a bipolar transistor 20, a P-type metal oxide semiconductor (PMOS) transistor 21, a resistor 22, and a battery 23. In an embodiment, the power supply circuit 12 takes a button battery to implement the battery 23. The base of the bipolar transistor 20 receives the rectified voltage signal S12, the collector thereof is coupled to a node N20, and the emitter thereof is coupled to a reference ground GND. The Gate of the PMOS transistor 21 is coupled to the node N20, the source thereof is coupled to the node N21, and the drain there of is coupled to a node N22. The resistor 22 is coupled between the nodes N20 and N21. The battery 23 is coupled to the node N21. In the embodiment, the battery 23 is capable of providing a sufficient voltage for the sensor 13 and the processor 14 to operate normally. Moreover, the power supply circuit 12 is coupled to the sensor 13 and the processor 14 at the node N22.

When the audio combo connector 15 receives the audio signal S10, the rectified voltage signal S12 has the specific voltage level. In the embodiment, the specific voltage level is equal to or higher than the level of the threshold voltage of the bipolar transistor 20, such as being equal to or higher than 0.6V. Since the base of the bipolar transistor 20 receives the rectified voltage signal S12 with the specific voltage level, the bipolar transistor 20 is turned on. At this time, the node N20 has a low voltage level to turn on the PMOS transistor 21 whose gate is coupled to the node N20. Accordingly, the battery 23 provides the voltage from itself to the node N22 through the turned-on PMOS transistor 21 to serve as the supply voltage Vsupply. The sensor 13 and the processor 14 which are coupled to the node N22 are thus powered by the supply voltage Vsupply to operate normally.

When the audio combo connector 15 does not receive the audio signal S10, the rectified voltage signal S12 does not have the specific voltage level. At this time, both the bipolar transistor 20 and the PMOS transistor 21 are turned off. Accordingly, the battery 23 stops providing the voltage to the node N22 to not serve as the supply voltage Vsupply. Since the sensor 13 and the processor 14 which are coupled to the node N22 are not powered by the supply voltage Vsupply, Both of them stop operating.

Figure 3:
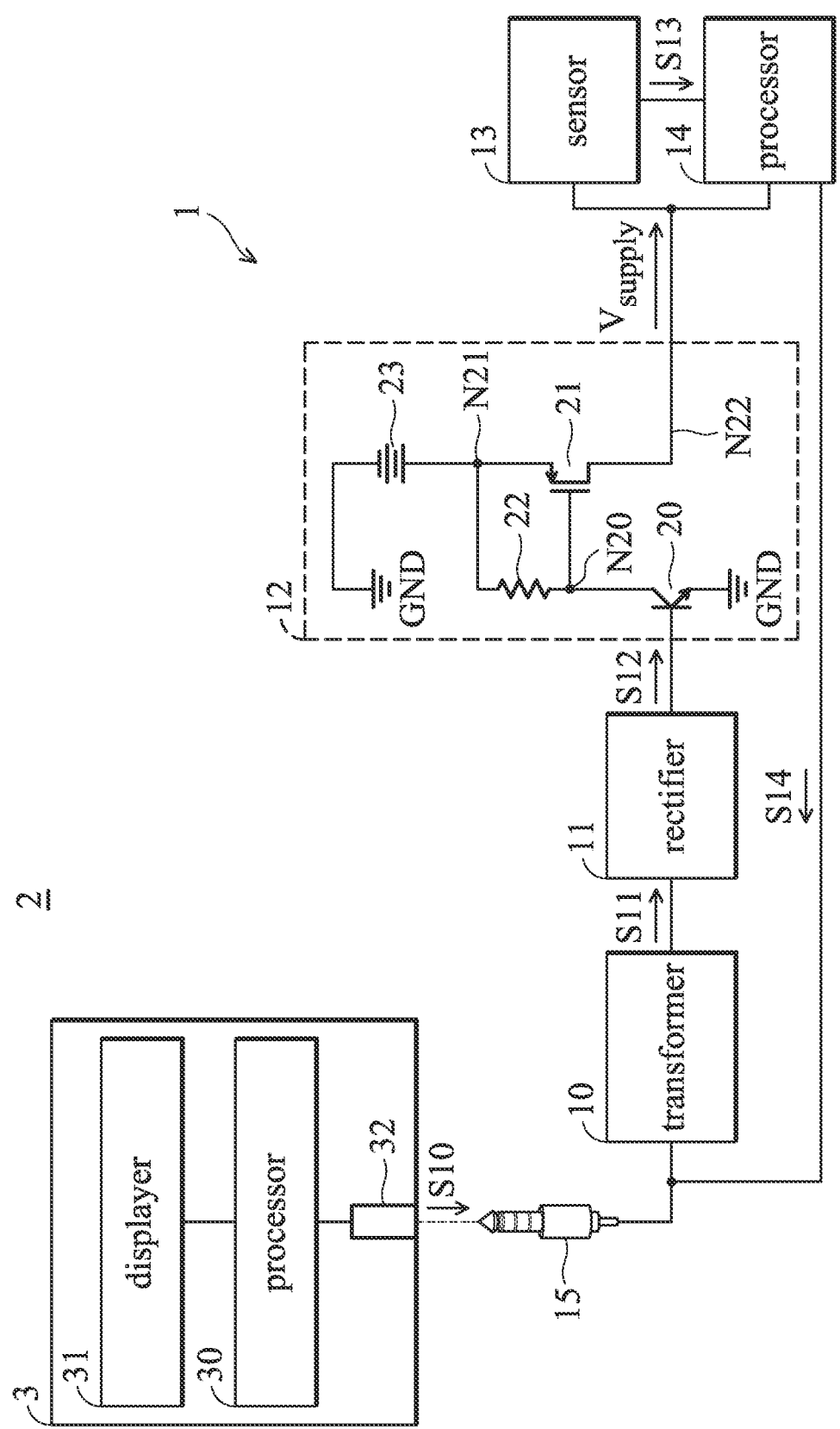
FIG. 3 shows an exemplary embodiment of a sensor system.

In an embodiment, the sensor device 1 can be connected with an external control device through the audio combo connector 15. Referring to FIG. 3, the sensor device 1 is connected with an external control device 3 through the audio combo connector 15. The control device 3 comprises a processor 30, a displayer 31, and an audio combo jack 32. The processor 30 is coupled to the audio combo jack 32. The internal circuit is capable of selectively generating an enable signal related to the providing of audio signals. The displayer 31 is controlled by the processor 30. When an enable signal is generated on the inside of the processor 30, the processor 30 generates an audio signal, such as the audio signal S10, in response to the enable signal. When the sensor device is being connected with the audio combo jack 32 of the control device 3 through the audio combo connector 15, the power supply circuit 12 in the sensor device 1 is then enabled to provide the supply voltage Vsupply as the description above. In an embodiment, in cases where the processor 30 does not generate an enable signal, even though the sensor device 1 is connected with the control device 3 through the audio combo connector 15, the power supply circuit 12 in the sensor device 1 is not enabled to provide the supply voltage Vsupply. This is because the processor 30 does not generate any audio signal.

In an embodiment, the processor 30 may be installed with an application program corresponding to the sensor device 1. In this case, the enable signal described above is generated by the application program.

In the embodiment, the audio combo connector 15 of the sensor device 1 and the audio combo jack 32 of the control device 3 perform bi-direction transmission. Moreover, the processor 30 provides audio signals or not according to whether the enable signal is generated, and further processes the signals received by the audio combo jack 32. For example, when the processor 14 of the sensor device 1 generates the output signal S14, the processor 14 may transmit the output signal S14 to the processor 30 through the audio combo connector 15 and the audio combo jack 32. The processor 30 may determine the result of the sensing operation according to the output signal S14. Moreover, the processor 30 may perform at least one specific processing operation and control other elements in the control device 3 according to the processed output signal S14. For example, after the processor 30 processes the output signal S14, the processor 30 controls the displayer 31 according to the processed output signal S14, such that the displayer 31 displays the result of the sensing operation performed by the sensor 13.

According to the embodiments, the sensor device 1 may not be equipped with a manual switch. If this is the case, once the sensor device 1 receives an audio signal, the power supply circuit 12 suppliers power automatically, so that the sensor 13 and the processor 14 can operate normally. Further, since the power supply circuit provides the supply voltage Vsupply just after an audio signal is received, the battery 23 has a longer service life.

According to the embodiments, since the sensor device 1 has an audio combo connector, the sensor device 1 applied for most of the current 3C products.

In an embodiment, the sensor device 1 may be an infrared sensor, such as an ear thermometer. In another embodiment, the control device 3 may be a personal digital assistant (PDA), a notebook computer, a desktop computer, a tablet computer, a smart phone, or an electronic device which is capable of generating audio signals. The sensor device 1 and the control device 3 operate together to form a sensor system 2.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A sensor system comprising
a control device having an audio combo jack and selectively providing an audio signal to the audio combo jack; and
a sensor device connected with the audio combo jack and comprising:

a transformer receiving the audio signal through the audio combo jack when the control device provides the audio signal and amplifying the audio signal to generate an amplified audio signal;

a rectifier, coupled to the transformer, receiving the amplified audio signal and rectifying the amplified audio signal to generate a rectified voltage signal;

a power supply circuit coupled to the rectifier and controlled by the rectified voltage signal to provide a supply voltage; and a sensor coupled to the power supply circuit and powered by the supply voltage to perform a sensing operation, wherein an output signal which carries information related the sensing operation is generated.

2. The sensor system as claimed in claim 1, wherein the sensor device further comprises:

a processor, coupled to the sensor, receiving a sensing signal which is generated by the sensor when the sensor performs the sensing operation and processing the sensing signal to generate the output signal, wherein the processor transmits the output signal to the control device through the audio combo jack.

3. The electronic device as claimed in claim 1, wherein the power supply circuit comprises:

a bipolar transistor having a base receiving the rectified voltage signal, a collector coupled to a first node, and a emitter coupled to reference ground;

a P-type metal oxide semiconductor (PMOS) transistor having a gate coupled to the first node, a source coupled to a second node, and a drain coupled to a third node;

a resistor coupled between the first node and the second node; and a battery coupled between the second node and the reference ground, wherein the sensor is coupled to the third node.

4. The sensor system as claimed in claim 3, wherein when the transformer receives the audio signal, the bipolar transistor and the PMOS transistor are turned on, and the battery provides the supply voltage to the third node.

5. The sensor system as claimed in claim 3, wherein when the transformer does not disclose the audio signal, the bipolar transistor and the PMOS transistor are turned off, and the battery stops providing the supply voltage to the third node.

6. The sensor system as claimed in claim 1, wherein the control device comprises:

a processor coupled to the audio combo jack, wherein when the processor generates an enable signal, the processor generates the audio signal to the audio combo jack, and wherein the processor receives the output signal from the sensor device through the audio combo jack to determine a result of the sensing operation.

7. The sensor system as claimed in claim 6, wherein the control device further comprises:

a displayer controlled by the processor and displaying the result of the sensing operation.

* * * * *